United States Patent [19]

Pes

[11] Patent Number: 5,470,540
[45] Date of Patent: Nov. 28, 1995

[54] APPARATUS AND PROCESS FOR INTRODUCING A SUSPENSION INTO A REACTOR

[75] Inventor: Robert Pes, Sausset les Pins, France

[73] Assignee: BP Chemicals Limited, London, England

[21] Appl. No.: 459,286

[22] Filed: Jun. 2, 1995

Related U.S. Application Data

[63] Continuation of Ser. No. 190,730, Jan. 31, 1994, abandoned, which is a continuation of Ser. No. 799,390, Nov. 27, 1991, abandoned.

[30] Foreign Application Priority Data

Dec. 14, 1990 [FR] France .................................... 90 16184

[51] Int. Cl.$^6$ ........................................................ B01J 8/08
[52] U.S. Cl. ........................... 422/145; 137/209; 137/572; 422/232
[58] Field of Search ..................................... 422/129, 145, 422/213, 232, 131; 436/180; 222/152, 450; 137/209, 572

[56] References Cited

U.S. PATENT DOCUMENTS

| 3,190,509 | 6/1965 | Kirchhoefer | 222/450 |
|---|---|---|---|
| 3,893,625 | 7/1975 | Wiggins | 137/572 |
| 3,929,411 | 12/1975 | Takano et al. | 137/572 X |
| 4,082,513 | 4/1978 | Andon . | |
| 4,398,852 | 8/1983 | Milligan . | |
| 4,774,299 | 9/1988 | Dumain et al. | 526/64 |
| 5,240,683 | 8/1993 | Maurel et al. | 422/135 |

FOREIGN PATENT DOCUMENTS

| 59-222222 | 12/1984 | Japan . |
|---|---|---|
| 1333738 | 10/1983 | United Kingdom . |
| 2111946 | 7/1985 | United Kingdom . |

Primary Examiner—Robert J. Warden
Assistant Examiner—Robert Carpenter
Attorney, Agent, or Firm—Brooks Haidt Haffner & Delahunty

[57] ABSTRACT

An apparatus and method for introducing a predetermined volume of suspension into a reactor from a storage vessel. According to the invention the storage vessel is connected via a first conduit to an intermediate vessel which is in turn connected to a feed vessel via a second conduit, the feed vessel is connected via a third conduit to the reactor, each of the first, second and third conduits, is provided with a shut-off valve, the vessels, conduits and valves being so arranged that the suspension can be transferred by gravity from the storage vessel to the intermediate vessel and from the intermediate vessel to the feed vessel and can be transferred from the feed vessel to the reactor by gravity and/or the effect of pressure difference between the feed vessel and the reactor. The present invention also relates to a process for introducing a predetermined volume of suspension into a reactor using the apparatus.

11 Claims, 2 Drawing Sheets

APPARATUS AND PROCESS FOR INTRODUCING A SUSPENSION INTO A REACTOR

This application is a continuation of application Ser. No. 08/190,730 filed on Jan. 31, 1994, which is a continuation of application Ser. No. 07/799,390, filed Nov. 27, 1991, both abandoned.

The present invention relates to an apparatus fop introducing a suspension into a reactor, in particular for introducing a suspension into a gas-phase alpha-olefin polymerisation reactor, and to a process using the apparatus of the invention.

A fluidized-bed polymerization reactor system generally comprises an upright elongate reactor in which the particles of the polymer being formed ape kept in the fluidized state by an upwardly flowing fluidization gas stream containing the alpha-olefin(s) to be polymerized. In the lower part of the reactor, there is usually a perforated or porous plate, commonly known as a fluidization grid, which enables the fluidization gas stream, which enters the reactor below the fluidization grid, to be distributed into the fluidized bed to keep the polymer particles in the fluidized state above the grid. The reactor system also usually comprises a recycle line connecting the top of the reactor to the bottom of the reactor below the fluidization grid. This recycle line generally comprises a compressor for circulating the gas mixture leaving the top of the reactor and at least one heat exchanger for cooling the gas mixture to remove heat of reaction before the gas mixture is returned to the bottom of the reactor. The reactor is provided with means for introducing the alpha-olefin(s), catalyst and other components of the reaction system, as well as means for removing the polymer product.

Catalysts suitable for polymerising alpha-olefins in gas phase fluidized-bed reactors are well known in the apt. The catalyst can be introduced into the reactor as a suspension in a liquid.

Japanese Patent Application published under no. 56-79533 discloses apparatus for feeding a catalyst suspension into a reactor, which apparatus comprises a storage vessel equipped with an external recycle line by which the suspension can be withdrawn from and returned to the storage vessel. A feed line connects the recycle line to the reactor. With this apparatus, the suspension can be continuously withdrawn from the storage vessel and fed either to the reactor or returned to the storage vessel. Thus, the suspension can be fed intermittently to the reactor even though it is continuously withdrawn from the storage vessel. The storage vessel is equipped with a mechanical stirrer and the recycle line has a pump. The use of the pump is likely to give rise to the appearance of very fine catalyst particles due to the grinding or attrition of the latter. Fine catalyst particles can cause problems, particularly in the operation of a gas-phase polymerisation reactor. Fine particles present in a fluidised bed reactor can be entrained out of the reactor with the fluidizing gas and may cause blockage of equipment in the recycle conduit or downstream of the reactor.

A process and apparatus have now been found for introducing solid particles in suspension in liquid into a reactor, while overcoming or at least mitigating the problem referred to above. More particularly the apparatus according to the invention does not require the use of a pump. The suspension is introduced into the reactor by gravity and/or the action of a gas pressure. Furthermore, the process of the invention can be used to transfer a suspension from a storage vessel to a reactor maintained at a pressure which is higher than that prevailing in the storage vessel.

Thus according to the present invention apparatus for introducing a predetermined volume of a suspension into a reactor from a storage vessel is characterised in that the storage vessel is connected via a first conduit to an intermediate vessel which is in turn connected to a reed vessel via a second conduit, the feed vessel is connected via a third conduit to the reactor, each of the first, second, and third conduits is provided with a shut-off valve, the vessels, conduits and valves being so arranged that the suspension can be transferred by gravity from the storage vessel to the intermediate vessel and from the intermediate vessel to the feed vessel and can be transferred from the feed vessel to the reactor by gravity and/or the effect of pressure difference between the feed vessel and the reactor.

The vessels can have any cross sectional shape but commonly have circular cross-sections.

The storage vessel is generally cylindrical and advantageously has a sufficient capacity to be capable of feeding the reactor with suspension for a period ranging from 1 to 10 days. Thus, for an industrial scale reactor, the storage vessel can have a volume between 0.5 and 10 $m^3$. The storage vessel can be provided with a stirring system intended to homogenise the suspension and/or with systems enabling a minimum or maximum height of suspension to be detected. It can be provided with a gas feed conduit and with a gas inlet conduit. In this case, the storage vessel can be provided with a gas pressure control system intended to maintain a constant pressure $P_1$ by introducing and/or releasing gas.

The intermediate vessel generally consists of a cylindrical tube preferably arranged vertically so as to tranfer by gravity its content into the feed vessel more easily. Its total internal capacity is greater than or in a very preferred manner substantially equal to the predetermined volume of suspension to be introduced into the reactor. In this last case the intermediate vessel is generally used for measuring the predetermined volume of suspension. In industrial plants the capacity of the intermediate vessel can typically vary between 0.1 and 10 liters. The intermediate vessel is connected, via the first conduit, to the storage vessel, in particular to the side wall or to the wall forming the lowest part of the storage vessel. Furthermore it is also connected, via the second conduit, to the reed vessel, in particular to the top of the feed vessel so as to facilitate the introduction of suspension into this vessel.

According to one embodiment an additional feed conduit can open into the intermediate vessel. This additional feed conduit can be employed for introducing another component, preferably a liquid, into the intermediate vessel so that it can afterwards be fed to the reactor.

The feed vessel is connected to the reactor via a third conduit, called the entry conduit. In order to facilitate the introduction of suspension into the reactor, the entry conduit is preferably arranged at or closed to the lowest part of the feed vessel. The capacity of the feed vessel is generally greater than that of the intermediate vessel. The feed vessel can conveniently comprise a cylindrical upper part and a conical lower part. In this case the entry conduit is preferably connected to the apex of the cone.

When the predetermined volume of suspension is introduced from the feed vessel into the reactor by the effect of a pressure difference between the feed vessel and the reactor, the feed vessel is provided with a gas feed conduit and optionally with a purge valve, which can be arranged on upper part of the vessel. The purge valve can be used in order to obtain in the feed vessel a pressure below the pressure of the reactor. The obtained pressure can be substantially equal or similar to that of the storage vessel. Furthermore the capacity of the feed vessel is sufficient to contain a volume of suspension and a quantity of gas under pressure such that the pressure difference between the vessel and the reactor enables the predetermined volume of suspension to be introduced into the reactor.

The entry conduit is provided with an entry valve. In order to limit the introduction of gas into the reactor, when pressure difference is used, the entry conduit is advantageously provided with an entry valve which is ultrafast in operation. It can also be provided with a safety valve arranged between the entry valve and the reactor for example in the neighbourhood of the end of the entry conduit which opens into the reactor.

The entry conduit preferably has a small diameter and a length which is as short as possible so as to contain only a small volume of suspension. It preferably opens into a wall of the reactor, so that the conduit does not extend into the reactor which could disturb its operation. Furthermore, in order to promote the dispersion of the suspension within the reactor, it is recommended that the entry conduit should open perpendicularly to a vertical wall of the reactor or advantageously in a direction pointing towards the bottom of the reactor, having a slope measured in relation to the horizontal plane, which can be up to 60° and in particular between 10° and 50°.

The invention includes a process for introducing a predetermined volume of a suspension contained in a storage vessel maintained at a pressure $P_1$ into a reactor maintained at a higher pressure $P_2$ characterised in that a predetermined volume of the suspension is transferred by gravity from the storage vessel to an intermediate vessel by opening and closing a valve in a conduit connecting the storage vessel to the intermediate vessel, the suspension is then tranferred by gravity to a feed vessel by opening then closing a valve in a conduit connecting the intermediate vessel to the feed vessel, the pressure in the feed vessel is raised to a pressure $P_3$ which is greater than $P_2$ by the introduction of gas into the reed vessel and then the suspension is tranferred from the feed vessel to the reactor by a rapid opening and closing of a valve in the conduit connecting the feed vessel and the reactor, such that the slurry is transferred assisted by the pressure difference ($P_3$–$P_2$), the pressure $P_4$ in the reed vessel after completion of the tranfer still being greater than $P_2$.

Throughout the description which follows and the example, the pressures are absolute pressure and are expressed in MPa.

The process of the invention can be carried out with the apparatus according to the invention with the proviso that the feed vessel is provided with a gas reed conduit and optionally with a purge valve.

According to the process of the invention, a reactor in which a pressure $P_2$ prevails is fed with a suspension contained in a storage vessel in which a pressure $P_1$ prevails. Preferably the suspension is stored under a gas which is inert towards the particles contained in the suspension such as nitrogen. The pressure $P_1$ is in most case equal or slighly higher than atmospheric pressure. For example $P_1$ can be comprised between 0.1 and 0.2 MPa. Furthermore, the pressure $P_1$ can be kept constant with the aid of a pressure control system.

In a preliminary step of the process, the feed vessel can be purged to the atmosphere by opening the purge valve when it is at a pressure higher than the pressure $P_1$ in particular with a view to obtaining a pressure $P_5$ which is no greater than pressure $P_1$. During this operation the valve arranged between the intermediate vessel and the feed vessel can be also opened so as to purge the intermediate vessel as well when $P_1$ is higher than atmospheric pressure. The purging operation is performed in order to obtain pressures of the same order of magnitude between the storage vessel and the feed vessel, which makes it possible to facilitate the use of the apparatus especially by avoiding movement of gas from the feed vessel towards the storage vessel.

In a first step of the process a volume of suspension is introduced into the intermediate vessel by opening and then closing the valve connecting the storage vessel to the intermediate vessel. This introduction is made easier when the pressure $P_1$ is greater than atmospheric pressure. In most cases the intermediate vessel is completely filled with the suspension because its capacity corresponds to the volume of suspension to be introduced into the reactor. However, it can also be filled with a smaller volume of suspension by limiting the time of opening of the valve which connects it to the storage vessel.

In a second step of the process a transfer of the volume of suspension from the intermediate vessel towards the feed vessel is carried out by opening and then closing the valve connecting the intermediate vessel to the feed vessel.

In a third step of the process the actual introduction of the volume of suspension into the reactor is performed. To do this, a gas which is preferably inert towards the particles present in the suspension, such as nitrogen, is introduced into the reed vessel, so as to obtain a pressure $P_3$ which is higher than the pressure $P_2$ prevailing in the reactor. It is essential that pressure difference $P_3$–$P_2$ should be able to introduce the volume of suspension into the reactor. This means that the gas pressure prevailing in the feed vessel must always be higher than the pressure $P_2$ even when all the suspension has been introduced into the reactor. Furthermore $P_3$ is advantageously choosen in relation with the capacity of the reed vessel in order to avoid disturbance of the working of the reactor and for having a good dispersion of the suspension in the reactor. After the introduction of gas, the entry valve is opened in order to introduce the volume of the suspension into the reactor. Closing of this valve takes place after the introduction of the volume of suspension and preferably very quickly, so as to limit the quantity of gas injected into the reactor. In all cases it is preferable to close the entry valve so as to obtain in the reed vessel a pressure $P_4$ which is higher than $P_2$ so as to avoid a gas flow of gas from the reactor towards the feed vessel. In practice the suspension is introduced into the reactor preferably by opening the entry valve and then closing it as soon as the pressure prevailing in the feed vessel reaches a predetermined valve $P_4$ which should indicate when all the suspension has been introduced into the reactor. According to an advantageous embodiment of the process, when the entry conduit is provided with a safety valve in addition to the entry valve, the actual introduction of suspension into the reactor takes place after the introduction of gas into the entry vessel, by opening the safety valve and then the entry valve and then by closing the entry valve and then the safety valve.

The steps of the process form a sequence which makes it possible to introduce a predetermined single volume of suspension into the reactor. The sequence can advantageously last from 1 to 500 seconds and preferably from 60 to 180 seconds. In order to introduce a suspension sequentially into a reactor the introduction sequence of the process may be repeated a number of times and preferably cyclically. In particular, from 1 to 20 introduction sequences may be performed per hour. Typically, from 1 to 20 liters of suspension per hour may be introduced in this way into a reactor of an industrial plant. This introduced quantity depends, of course, on a number of factors and in particular on the capacity of the intermediate chamber, on the length of an introduction sequence and on the number of sequences per hour. When the intermediate vessel is provided with a liquid reed conduit, this conduit can be used to clean the introduction apparatus in order to avoid blockage, especially in the entry conduit. For example, during a sequential introduction of suspension into a reactor one or more introductions of liquid can be interposed between two introductions of suspension.

The process of the invention is particularly useful for introducing particles with catalytic activity suspended in a liquid into a reactor with a fluidised and/or mechanically stirred bed, in which a gas-phase polymerisation or copolymerisation of alpha-olefins containing from 2 to 12 carbon atoms is carried out. In this case the pressure $P_2$ is in most cases between 0.1 and 5 MPa. The gas-phase polymerisation reactor may advantageously consist of equipment such as that described in French Patent No. 4,207,145 or French Patent No. 2,335,526. This equipement comprises essentially a fluidised-bed polymerisation reactor comprising a vertical cylinder equipped with a fluidisation grid and supporting a disengagement chamber and a conduit for recycling the gaseous reaction mixture, connecting the top of the disengagement chamber to the base of the reactor.

The particles with catalytic activity may be particles of a solid catalyst containing at least one transition metal of groups IV, V and VI of the Periodic Classification of the elements. This solid catalyst can be either a catalyst of the Ziegler-Natta type, comprising especially a titanium and/or vanadium and/or zirconium halide, preferably a magnesium compound and/or refractory oxide, or a catalyst based on chromium oxide supported on a refractory oxide such as silica or alumina, which catalyst is thermally activated in a non-reducing atmosphere. The catalyst particles to be introduced into the reactor can have a mass-average diameter Dm of between 50 and 150 microns, preferably between 70 and 120 microns, and a particle size distribution such that the ratio of Dm to the number-average diamater Dn of the said particles is lower than 4, preferably lower than 3.

The particles with catalytic activity to be introduced into the reactor can also be alpha-olefin prepolymer obtained by bringing one or more alpha-olefins into contact with a catalyst as described above and with at least one organometallic compound of a metal of groups II and III of Periodic Table of Elements, in particular an organoaluminium, organozinc or organomagnesium compound. The prepolymer may have a molar ratio of the metal of the organometallic compound to the transition metal of the catalyst of between 0.1 and 20, preferably between 0.2 and 10. It may have a relative density of between 0.930 and 0.970, and may contain from $2\times10^{-3}$ to 1 millimole of transition metal per gram. The particles of prepolymer with catalytic activity can have a mass-average diameter Dm ranging from 80 to 400 microns, preferably from 100 to 300 microns, and a particle size distribution such that the ratio Dm/Dn of the said particles is lower than 4, preferably lower than 3.

The particles with catalytic activity to be introduced in suspension into the reactor can also consist of an alpha-olefin polymer or copolymer prepared beforehand in another polymerisation reactor by bringing one or more alpha-olefins into contact with an optionally prepolymerised catalyst and with at least one organometallic compound such those described above. The polymer or copolymer can have a molar ratio of the metal of the organometallic compound to the transition metal of the catalyst of between 0.1 and 50, preferably between 0.2 and 20, and more particularly between 0.5 and 10. The prepolymer or copolymer can have a relative density ranging from 0.880 to 0.970 and can contain less than $2\times10^{-3}$ millimoles of transition metal per gram. The particles of polymer or copolymer with catalytic activity can have a mass-average diameter Dm larger than 400 microns and smaller than 1000 microns, and a particle size distribution such that the ratio Dm/Dn of the said particles is lower than 4, preferably lower than 3.

The liquid in which the particles are in suspension is generally a solvent which is inert towards the particles, such as a saturated hydrocarbon containing from 3 to 10 carbon atoms, and in particular n-hexane or n-heptane. However, in some cases the liquid of the suspension can be a reactive solvent such as one or more alpha-olefins. The suspension to be introduced into the reactor can contain from 5 to 500 g of particles per liter of liquid. More particularly it can contain from 200 to 300 g of prepolymer per liter of the liquid.

BRIEF DESCRIPTION OF THE DRAWINGS

The characteristics of the invention are illustrated by means of FIGS. 1 and 2.

FIG. 1 shows diagrammatically an apparatus for introducing suspension into a reactor. It comprises a storage vessel (1), an intermediate vessel (2) a feed vessel (3). The storage vessel (1) is connected to the intermediate vessel (2) via a first conduit (4) provided with a shut-off valve (5), the intermediate vessel (2) is connected to the feed vessel (3) via a second conduit (6) provided with a shut-off valve (7), the feed vessel (3) is connected to the reactor (11) via a third conduit (8) provided with an entry valve (9) and with a safety valve (10). The storage vessel (1) is fed with suspension by the conduit (12). The intermediate vessel (2) consists of a vertical tube (2), and is provided with a liquid reed conduit (13). The feed vessel (3) consists of a cylindrical upper part and of a lower part in the form of a cone. This feed vessel (3) is provided with a purge valve (16) and with a gas delivery conduit (14) equipped with a valve (15).

FIG. 2 shows diagrammatically the changes in pressure in the feed vessel (3) during a sequence of introduction of suspension into the reactor (11). The abscissa axis represents time and the ordinate axis the pressure. $P_1$ and $P_2$ denote the pressure in the storage vessel (1) and in the reactor (11) respectively. $T_1$ denotes the period of opening of the valve (15), $T_3$ the period of opening of the valve (9) and $T_5$ shows the period of opening of the purge valve (16).

The present invention is illustrated below with Example 1.

Example 1

Figure 1:
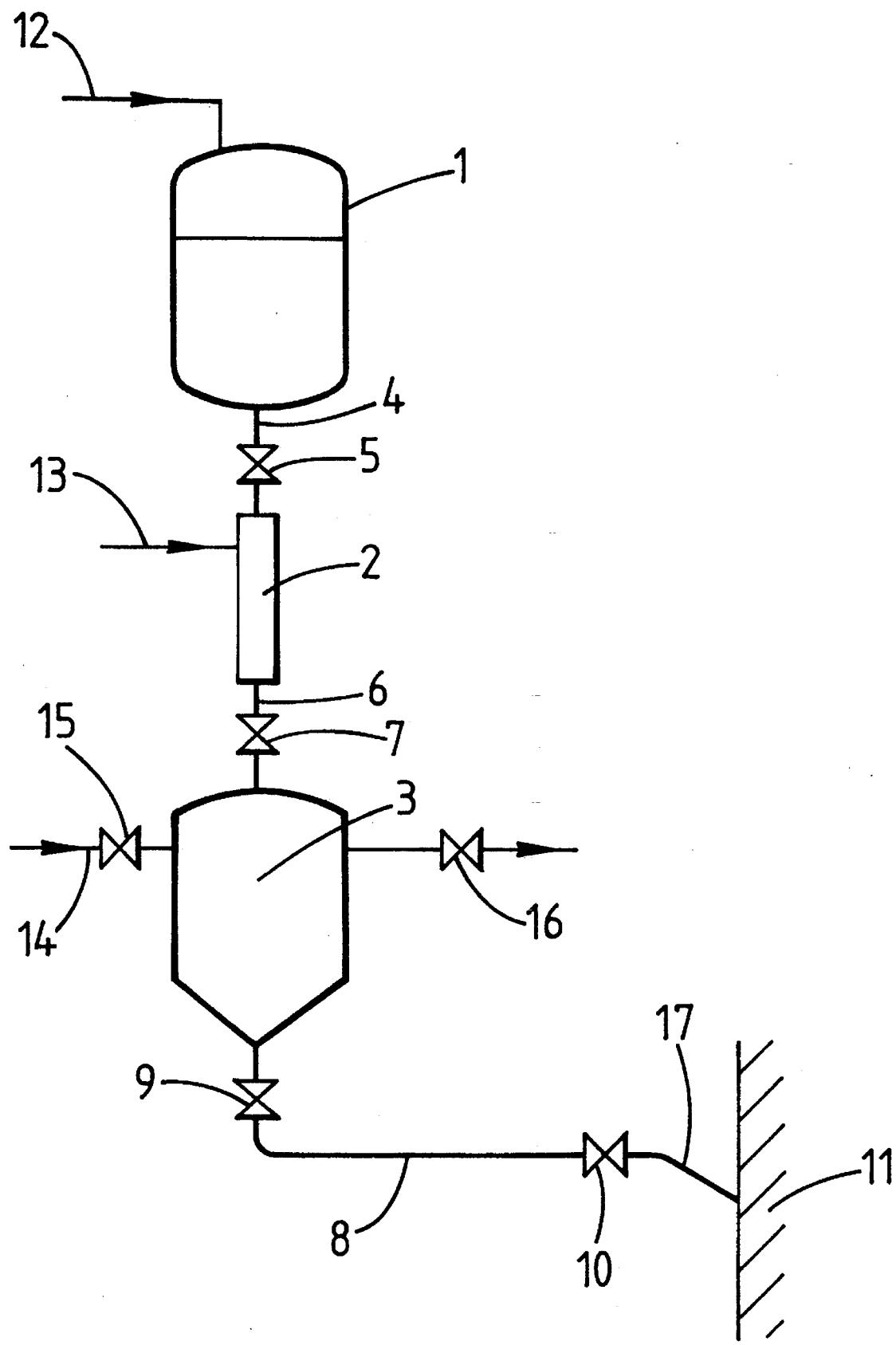
FIG. 1 shows an apparatus according to the present invention.
Figure 2:
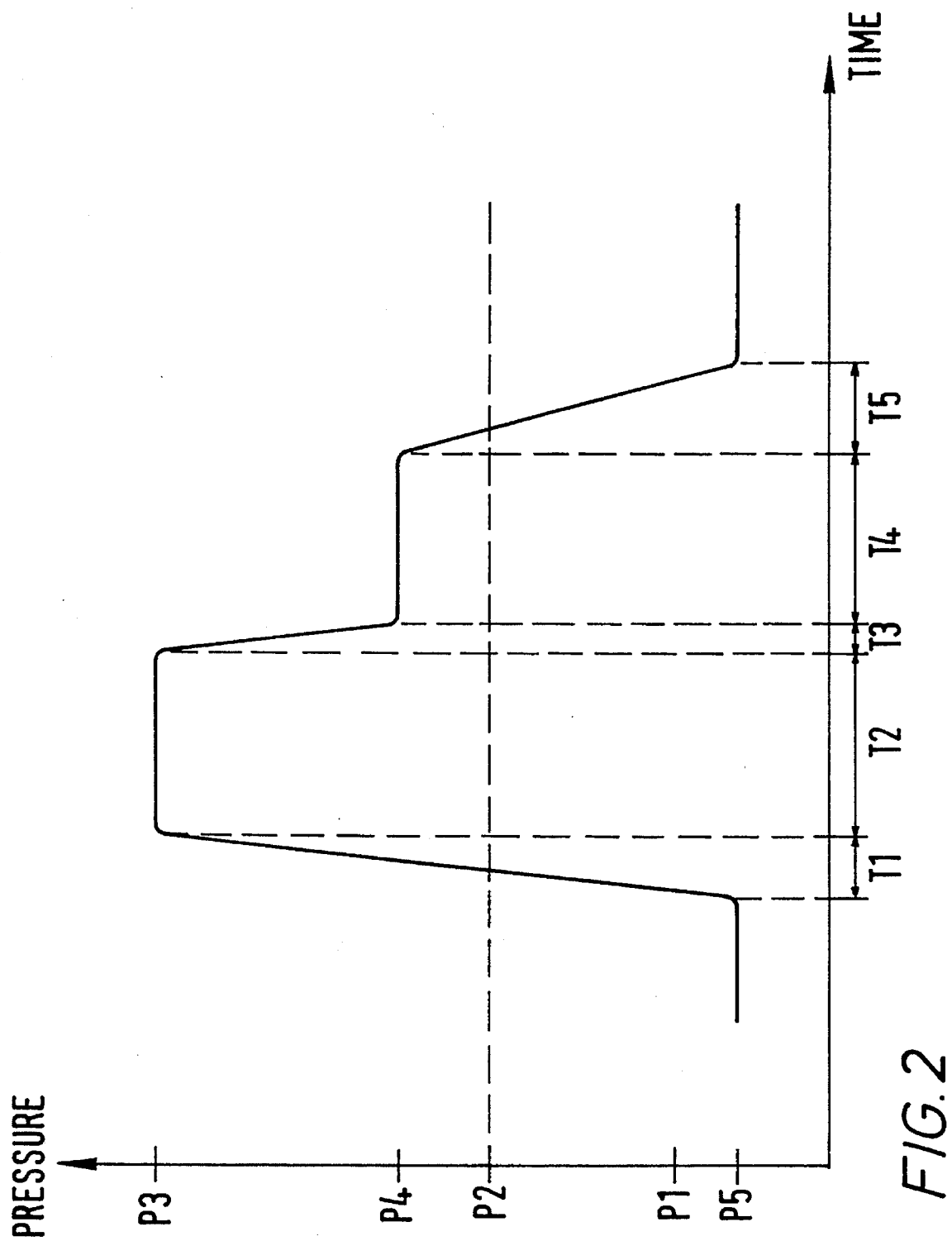
FIG. 2 shows the changes in pressure in the feed vessel of the apparatus during an injection sequence performed according to the process of the invention.

The operation is carried out in a device as shown in FIG. 1 comprising (a) a cylindrical 1.5 m³ storage vessel (1) (b) an intermediate vessel consisting of a vertical tube 4.6 cm in internal diameter and with an internal capacity of exactly 0.5 liters, (c) a reed vessel with a total capacity of 19 l, consisting of a cylindrical part 25 cm in diameter and with a height of 43 cm, and of a conical part which has a large height of 31 cm, (d) of a entry conduit (8) which has a diameter of 1.3 cm and a total length of 2 m and whose end part (17) opens into the reactor in a direction pointing downwards and at a slope of 30° relative to the horizontal plane. The storage vessel initially contains 1 m³ of a suspension containing 210 g per liter of particles in n-hexane. The particles comprised ethylene prepolymer prepared from catalyst as described in Example 1 of French Patent No. 2 405 961, containing 40 g of polyethylene per millimole of titanium. This storage vessel (1) is kept at a pressure $P_1$ of 0.150 MPa.

The introduction of a volume of 0.5 l of suspension into the fluidised-bed reactor (11) where a gas-phase polymerisation reaction of ethylene is carried out at a pressure of 2.0 MPa is performed by carrying out the following operations:

a) the feed vessel (3) is purged by opening the valve (16) until a pressure $P_5$ equal to 0.105 MPa is obtained.

b) 0.5 l of suspension ape introduced into the intermediate chamber (2) by opening the valve (5) and then closing it again.

c) 0.5 l of suspension are transferred from the intermediate vessel (2) towards the feed vessel (3) by opening the valve (7) and then closing it again.

d) 0.5 l of suspension in the feed vessel (3) are introduced into the reactor (11) in a first step by introducing nitrogen by means of the conduit (14) until a pressure of 2.15 MPa is obtained and then, in a second step, by opening the valve (10) and then the valve (9) until a pressure of 2.05 MPa is obtained and to close the valve (9) and then the valve (10).

This introduction sequence is repeated 15 times in 1 hour.

I claim:

1. An apparatus for introducing a predetermined volume of suspension into a reactor comprising:

(a) a reactor, (b) a storage vessel maintained at a pressure $P_1$, (c) an intermediate vessel connected to the storage vessel via a first conduit provided with a shut-off valve, said intermediate vessel having an internal capacity substantially equal to the predetermined volume of suspension, wherein the shut-off valve, the conduit and the intermediate vessel being so arranged that the volume of suspension can be transferred by gravity from the storage vessel to the intermediate vessel, and (d) a feed vessel connected to the intermediate vessel via a second conduit provided with a shut-off valve so arranged that the predetermined volume of suspension can be transferred by gravity from the intermediate vessel to the feed vessel and connected to the reactor maintained at a pressure $P_2$ higher than $P_1$, via a third conduit arranged at or close to the lowest part of the feed vessel and provided with an entry shut-off valve, the feed vessel being provided with a gas feed conduit and having a capacity sufficient to contain a volume of suspension and a quantity of gas under pressure such that the pressure difference between the feed vessel and the reactor enables the predetermined volume of suspension to be introduced into the reactor.

2. An apparatus according to claim 1, wherein the intermediate vessel is a cylindrical tube arranged vertically.

3. An apparatus according to claim 1, wherein an additional feed conduit opens into the intermediate vessel.

4. An apparatus according to claim 1, wherein the shape of the feed vessel comprises a cylindrical upper part and a lower part which is a cone.

5. An apparatus according to claim 1, wherein the third conduit is provided with a safety valve arranged between the entry valve and the reactor.

6. An apparatus according to claim 1, wherein the feed vessel is provided with a purge valve.

7. A process for introducing a predetermined volume of suspension contained in a storage vessel maintained at a pressure P1, into a reactor maintained at a higher pressure P2, comprising the following steps:

(a) providing a storage vessel maintained at a pressure P1, an intermediate vessel, a feed vessel, and a reactor maintained at a higher pressure P2, (b) transferring by gravity the predetermined volume of suspension from the storage vessel to the intermediate vessel by opening and closing a valve in the conduit connecting the storage vessel and the intermediate vessel, (c) transferring by gravity the volume of suspension to the feed vessel by opening and closing a valve in a conduit connecting the intermediate vessel and the feed vessel, (d) introducing a gas into the feed vessel by means of a gas feed conduit to obtain a pressure P3 which is greater than P2 and such that the difference P3–P2 is sufficient to introduce the volume of suspension into the reactor, (e) transferring the suspension to the reactor by a rapid opening and closing of a valve in a conduit connecting the feed vessel and the reactor, the pressure P4 in the feed vessel after completion of the transfer and after the closing of the valve still being greater than P2.

8. A process according to claim 7, further comprising before step (b) a preliminary step during which the feed vessel is purged by opening a purge valve arranged on the upper part of the feed vessel.

9. A process according to claim 8, wherein during the preliminary step the valve arranged between the intermediate vessel and the feed vessel is opened in order to purge the intermediate vessel.

10. A process according to claim 7, wherein the sequence of steps (b) to (e) is repeated a number of times.

11. A process according to claim 10, wherein a liquid is introduced into the intermediate vessel by means of a feed conduit which opens into the intermediate vessel, the liquid is then transferred into the feed vessel before being introduced into the reactor.

* * * * *

UNITED STATES PATENT AND TRADEMARK OFFICE
CERTIFICATE OF CORRECTION

PATENT NO. : 5,470,540  
DATED : November 28, 1995  
INVENTOR(S) : ROBERT PES

Page 1 of 2

It is certified that error appears in the above-indentified patent and that said Letters Patent is hereby corrected as shown below:

Col. 1, l. 9, correct the spelling of the word "for"

Col. 1, l. 16, correct the spelling of the word "are"

Col. 1, l. 35, correct the spelling of the word "art"

Col. 2, l. 42, correct the spelling of the word "feed"

Col. 3, l. 38, correct the spelling of the word "feed"

Col. 3, l. 42, correct the spelling of the word "feed"

Col. 3, l. 50, correct the spelling of the word "feed"

Col. 4, l. 27, correct the spelling of the word "feed"

Col. 4, l. 43, correct the spelling of the word "feed"

Col. 5, l. 5, correct the spelling of the word "feed"

Col. 6, l. 38, correct the spelling of the word "feed"

Col. 6, l. 60, correct the spelling of the word "feed"

UNITED STATES PATENT AND TRADEMARK OFFICE
CERTIFICATE OF CORRECTION

PATENT NO. : 5,470,540
DATED : November 28, 1995
INVENTOR(S) : ROBERT PES

It is certified that error appears in the above-indentified patent and that said Letters Patent is hereby corrected as shown below:

Col. 7, l. 14, correct the spelling of the word "a<u>r</u>e"

Claim 7, col. 8, l. 22, should read "in <u>a</u> conduit"

Signed and Sealed this

Seventh Day of May, 1996

Attest:

BRUCE LEHMAN

Attesting Officer

Commissioner of Patents and Trademarks